United States Patent
Seo et al.

(10) Patent No.: US 12,431,668 B2
(45) Date of Patent: Sep. 30, 2025

(54) SHIELD CONNECTOR

(71) Applicant: YURA CO., LTD., Hwaseong-si (KR)

(72) Inventors: Jeong Ho Seo, Hwaseong-si (KR);
Byeong Jun Yoo, Seongnam-si (KR)

(73) Assignee: YURA CO., LTD., Hwaseong-si (KR)

( * ) Notice: Subject to any disclaimer, the term of this patent is extended or adjusted under 35 U.S.C. 154(b) by 370 days.

(21) Appl. No.: 18/084,270

(22) Filed: Dec. 19, 2022

(65) Prior Publication Data

US 2023/0198208 A1    Jun. 22, 2023

(30) Foreign Application Priority Data

Dec. 22, 2021    (KR) .................. 10-2021-0185253

(51) Int. Cl.
*H01R 13/6582*    (2011.01)
*H01R 13/42*    (2006.01)
*H01R 13/52*    (2006.01)

(52) U.S. Cl.
CPC ......... *H01R 13/6582* (2013.01); *H01R 13/42* (2013.01); *H01R 13/521* (2013.01)

(58) Field of Classification Search
CPC .. H01R 13/6582; H01R 13/42; H01R 13/521; H01R 13/5205; H01R 13/5208; H01R 13/5221; H01R 13/6596; H01R 13/5216; H01R 13/6581; H02G 15/013
See application file for complete search history.

(56) References Cited

U.S. PATENT DOCUMENTS 9,653,859 B1 * 5/2017 Moore ................. H01R 13/41
2021/0151224 A1   5/2021 Albukrek

FOREIGN PATENT DOCUMENTS

| DE | 102019132495 | 6/2021 |
|---|---|---|
| JP | 2020-170651 | 10/2020 |
| KR | 10-2013-0011430 | 1/2013 |
| KR | 20170073922 | 6/2017 |
| WO | 2018127428 | 7/2018 |
| WO | 2021/040632 | 3/2021 |

OTHER PUBLICATIONS

Extended European Search Report for European Application No. 22208112.7, dated May 17, 2023.
European Examination Report (Communication pursuant to Article 94(3) EPC) for European Application No. 22208112.7, dated Apr. 23, 2025.

* cited by examiner

*Primary Examiner* — Briggitte R. Hammond
(74) *Attorney, Agent, or Firm* — KILE PARK REED & HOUTTEMAN PLLC

(57) ABSTRACT

Disclosed is a shield connector for supporting cables such that terminals of the cables are directly connected to a terminal coupling portion inside a unit, the shield connector including: a fixing plate which includes fixing part-cable through-holes, through which the cables pass, and a holding fastening portion; and a sub assembly which includes movable part-cable through-holes, through which the cables pass, and has one surface supported by the fixing plate. The sub assembly includes: a shield plate which is in contact with shield portions of each of the cables and has the outer circumference in contact with a shield part of the unit; and a shield plate-fixing plate having one surface that fixes the shield plate. Therefore, the shield connector makes it possible to directly install the cable in the unit without the need for the separate male and female connectors.

5 Claims, 8 Drawing Sheets

SHIELD CONNECTOR

CROSS-REFERENCE TO RELATED APPLICATIONS

This U.S. non-provisional patent application claims priority under 35 U.S.C. § 119 of Korean Patent Application No. 10-2021-0185253, filed on Dec. 22, 2021, the entire contents of which are hereby incorporated by reference.

FIELD OF THE INVENTION

The present invention disclosed herein relates to a shield connector and, more particularly, to a shield connector provided with an electromagnetic wave shielding function.

BACKGROUND ART

Various electric device units are used in a vehicle, and the vehicle is provided with batteries to supply power to the electric device units. In addition, the vehicle includes various cables for connecting the batteries and the electric device units to each other, and various connectors are used to connect a cable to another cable or to connect the cable to the unit.

Also, in recent years, high voltage has been adopted to electrify components, develop eco-friendly vehicles such as electric vehicles and hydrogen vehicles, and increase efficiency of electric device units. As a result, cables used in vehicles and connectors for connecting these cables have to be developed for high voltage. When high-voltage current flows through a high-voltage cable and a connector, electromagnetic waves are generated and affect nearby electric device units. In order to block the above effect, blocking shields are applied to the high-voltage cables, and structures for connection to the blocking shields are also applied to connectors that connect the high-voltage cables to each other. The connectors, to which the shielding shields are utilized, are referred to as shield connectors and high-voltage connectors.

Figure 1:
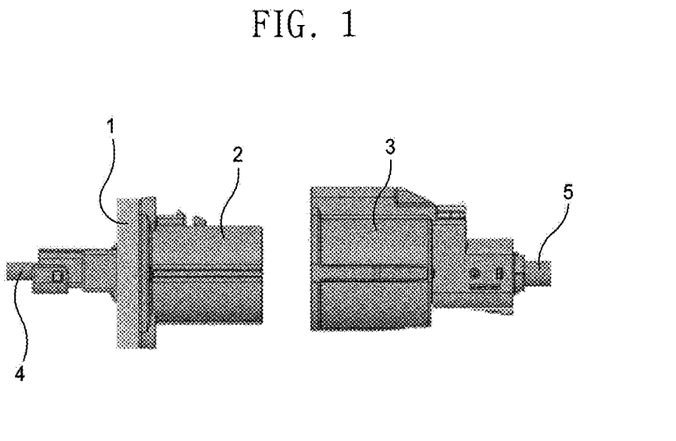
FIG. 1 is a side view illustrating a connector utilized in a unit according to the related art.

FIG. 1 is a side view illustrating a connector utilized in a unit according to the related art.

According to the related art, a wire 4 inside a unit 1 is connected to a wire 5 outside the unit 1, through a male connector 2 fixed to a side wall of the unit 1 and a female connector 3 detachably attached to the male connector 2. As described above, the separate male and female connectors have to be used in order to connect the cable to the unit 1. This not only increases the number of components and the production costs, but also goes against the recent vehicle design trend in which weight reduction is very important.

SUMMARY OF THE INVENTION

To solve the above-mentioned limitations, the present invention provides a shield connector that can reduce the number of components and costs and decrease the weight of the required components.

In accordance with an embodiment of the present invention, provided is a shield connector for supporting cables such that terminals of the cables are directly connected to a terminal coupling portion inside a unit, the shield connector including: a fixing plate which includes fixing part-cable through-holes, through which the cables pass, and a holding fastening portion; and a sub assembly which includes movable part-cable through-holes, through which the cables pass, and has one surface supported by the fixing plate, wherein the sub assembly includes: a shield plate which is in contact with shield portions of each of the cables and has the outer circumference in contact with a shield part of the unit; and a shield plate-fixing plate having one surface that fixes the shield plate.

The sub assembly may include an inner seal which is fixed to the other surface of the shield plate-fixing plate and seals a contact surface with the unit.

The shield connector may further include an outer seal which is positioned between the sub assembly and the fixing plate and seals a contact surface with the unit.

The shield plate may include: a side surface-fixing plate which surrounds a side surface of the shield plate-fixing plate and is fixed to the shield plate-fixing plate; and a unit-elastic contact portion having a spring shape that protrudes from the side surface-fixing plate.

A locking groove may be recessed from the side surface of the shield plate-fixing plate, and the side surface-fixing plate may further include a locking lance inserted into the locking groove.

The sub assembly may further include: a seal holding protrusion protruding from the other surface of the shield plate-fixing plate; and a seal fastening groove which passes through the inner seal so that the seal holding protrusion is inserted therein.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF THE PREFERRED EMBODIMENTS

Hereinafter, embodiments of the present invention will be described in detail with reference to the drawings.

Figure 2:
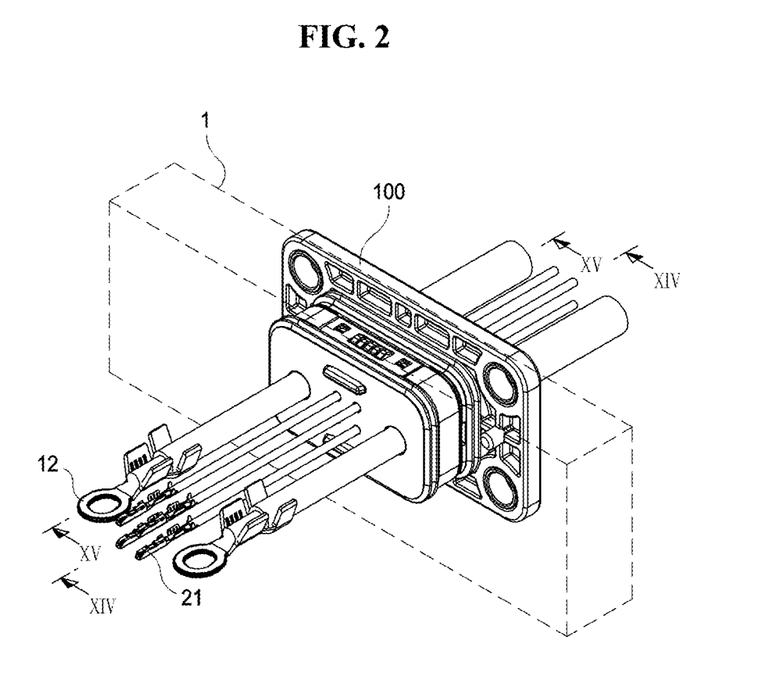
FIG. 2 is a perspective view showing a state in which a cable is coupled to a shield connector according to an embodiment of the present invention.
Figure 3:
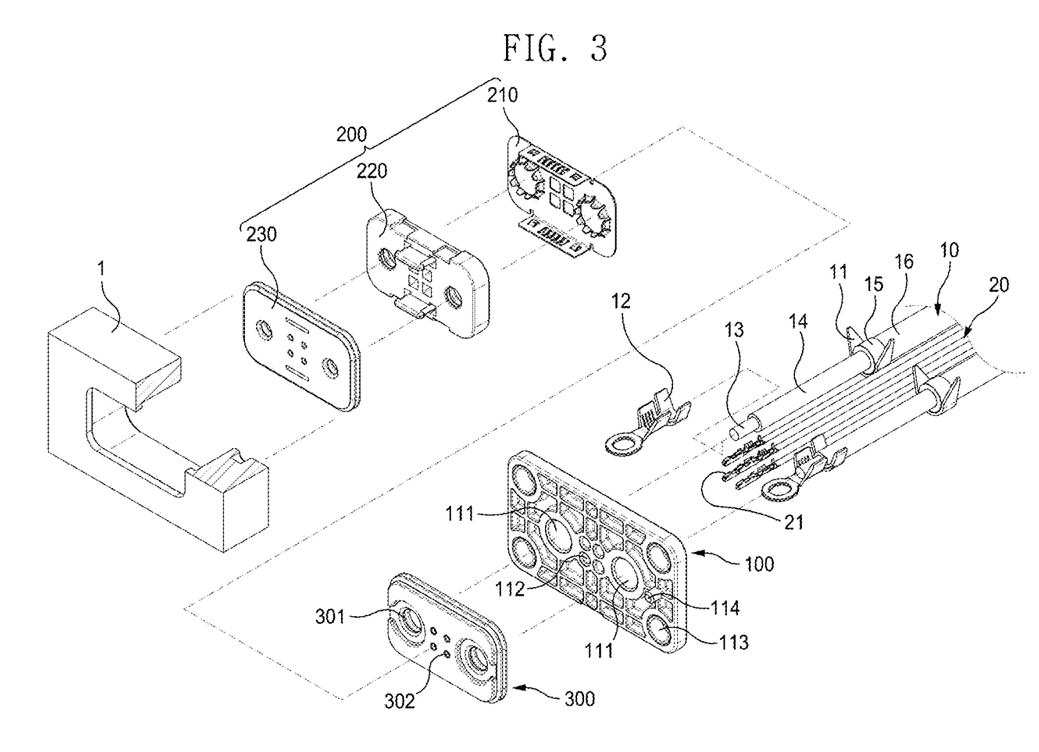
FIG. 3 is an exploded perspective view of FIG. 2.

FIG. 2 is a perspective view showing a state in which a cable is coupled to a shield connector according to an embodiment of the present invention, and FIG. 3 is an exploded perspective view of FIG. 2.

As illustrated in the drawings, the present invention relates to a shield connector for supporting cables 10 and 20 such that terminals 12 and 21 of the cables 10 and 20 are directly connected to a terminal coupling portion inside a unit 1. The unit may represent various electric devices such as control units for controlling various junction boxes, an engine, a transmission, and the like which are used in a vehicle. The terminal coupling portion (not shown) inside the unit 1 includes various fastening portions to which the terminals 12 and 21 may be fastened.

The cables 10 and 20 may include a high-voltage shield cable 10 and a low-voltage signal cable 20. The high-voltage shield cable 10 includes a conductive core wire 13, an inner sheath 14 surrounding the core wire 13, a shield wire 15 surrounding the inner sheath 14, and an outer sheath 16 surrounding the shield wire 15. A high-voltage terminal 12 is electrically connected to the core wire 13 and fixed to the inner sheath 14. In an example of FIG. 2, the high-voltage terminal 12 has the form of a washer and may be coupled to the terminal coupling portion (not shown) by a bolt. The shield wire 15 is fixed by a shield ring 11 after a portion thereof is formed to cover the outer sheath 16. The shield portions 11 and 15 of the cable 10 has a concept that includes the shield wire 15 and the shield ring 11.

The low-voltage cable 20 includes a core wire and a sheath for protecting the core wire, and the terminal 21 may be electrically connected to the core wire. The low-voltage cable is used to transmit control signals related to an interlock function and the like.

The shield connector according to an embodiment of the present invention includes: a fixing plate 100 which includes fixing part-cable through-holes 111 and 112, through which the cables 10 and 20 may pass, and a holding fastening portion 113; and a sub assembly 200 which includes movable part-cable through-holes, through which the cables 10 and 20 may pass, and has one surface supported by the fixing plate 100.

The fixing plate 100 has a flat plate shape, and the fixing part-cable through-holes 111 and 112 and the holding fastening portion 113 pass therethrough. The fixing part-cable through-holes 111 and 112 include a high-voltage fixing part-cable through-hole 111, through which the high-voltage cable 10 passes, and a low-voltage fixing part-cable through-hole 112, through which the low-voltage cable 20 passes. The holding fastening portion 113 is formed such that a bolt or the like may be inserted therein. In addition, a temporarily holding protrusion 114 protrudes from a surface of the fixing plate 100 that is in contact with the unit 1.

The sub assembly 200 includes: a shield plate 210 which is in contact with shield portions 11 and 15 of the cable 10 and has the outer circumference in contact with a shield part of the unit 1; a shield plate-fixing plate 220 having one surface that fixes the shield plate 210; and an inner seal 230 which is fixed to the other surface of the shield plate-fixing plate 220 and seals a contact surface with the unit 1.

Also, the shield connector further includes an outer seal 300 which is positioned between the sub assembly 200 and the fixing plate 100 and seals a contact surface with the unit 1. The outer seal 300 includes an elastic material and has the form of a plate. Also, outer seal-cable through-holes 301 and 302 pass through the outer seal 300.

Figure 4:
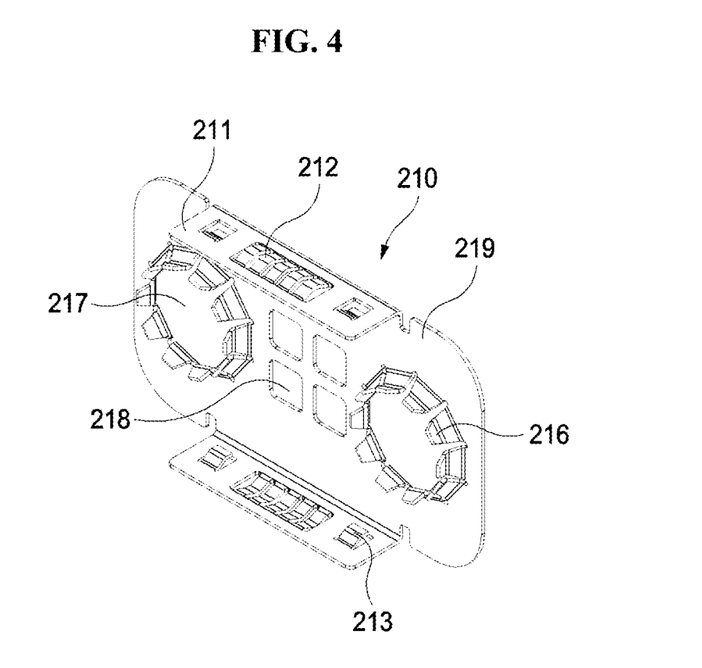
FIG. 4 is a perspective view of the shield plate of FIG. 2.
Figure 5:
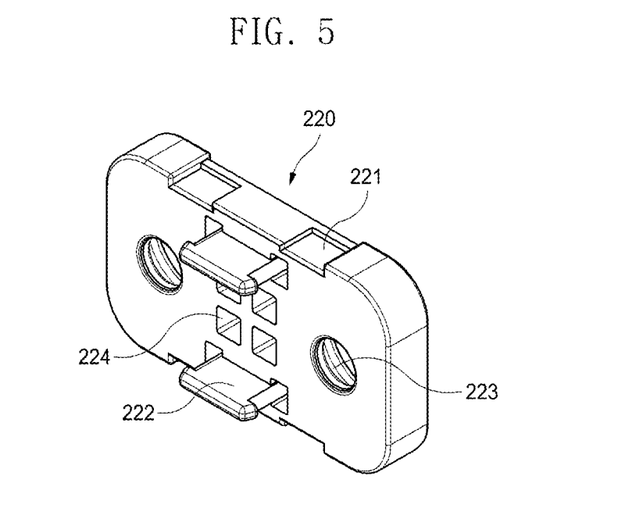
FIG. 5 is a perspective view of the fixing plate of the FIG. 2.
Figure 6:
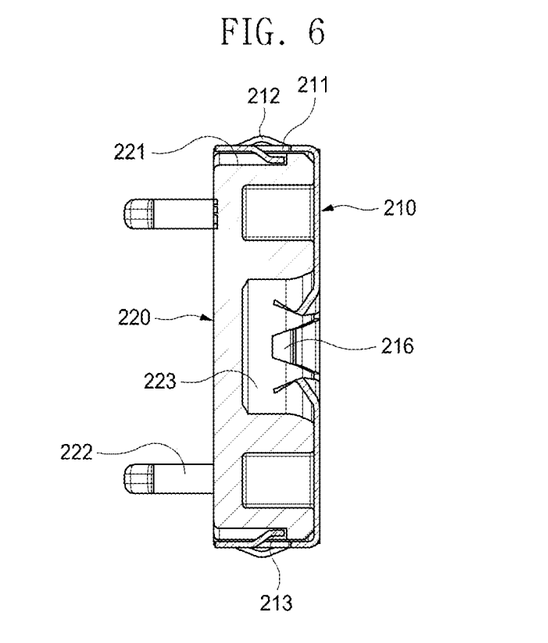
FIG. 6 is a cross-sectional view showing a state in which the shield plate and the fixing plate of FIG. 2 are coupled to each other.
Figure 7:
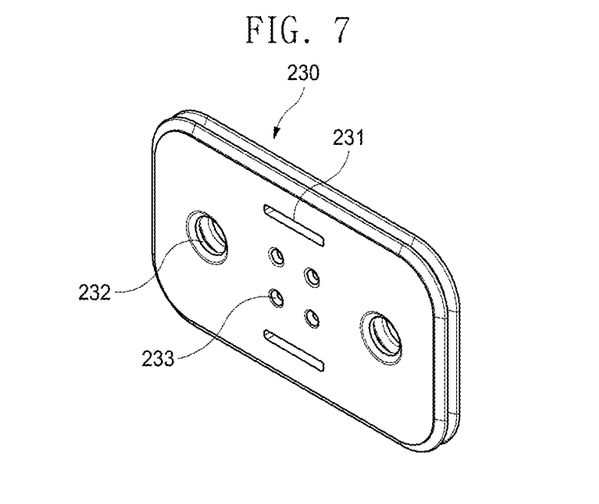
FIG. 7 is a perspective view of the inner seal of FIG. 2.
Figure 8:
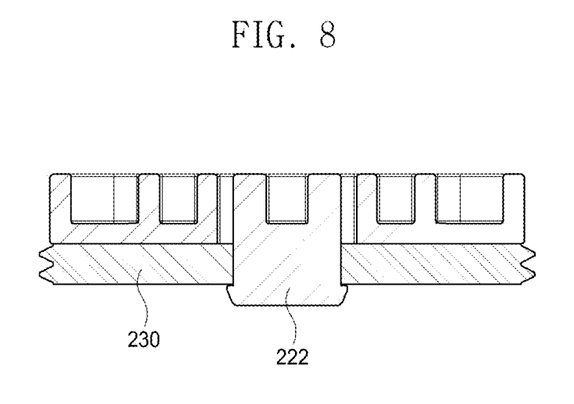
FIG. 8 is a cross-sectional view showing a state in which the shield plate-fixing plate and the inner seal of FIG. 2 are coupled to each other.

FIG. 4 is a perspective view of the shield plate of FIG. 2, FIG. 5 is a perspective view of the fixing plate of the FIG. 2, FIG. 6 is a cross-sectional view showing a state in which the shield plate and the fixing plate of FIG. 2 are coupled to each other, FIG. 7 is a perspective view of the inner seal of FIG. 2, and FIG. 8 is a cross-sectional view showing a state in which the shield plate-fixing plate and the inner seal of FIG. 2 are coupled to each other.

The shield plate 210 includes: a side surface-fixing plate 211 which surrounds a side surface of the shield plate-fixing plate 220 and is fixed to the shield plate-fixing plate 220; and a unit-elastic contact portion 212 having a spring shape that protrudes from the side surface-fixing plate 211.

The shield plate 210 includes side surface-fixing plates 211 that are formed by bending the upper and lower sides of a body plate 219 having the form of a conductive material (e.g., metal) plate. The body plate 219 has shield plate-cable through-holes 217 and 218 that pass therethrough. The shield plate-cable through-holes 217 and 218 includes a high-voltage cable shield plate-cable through-hole 217 and a low-voltage cable shield plate-cable through-hole 218. An elastic contact portion 216 having a spring structure is formed on the inner circumferential surface of the high-voltage cable shield plate-cable through-hole 217 so as to come into elastic contact with the shield portions 11 and 15 of the cable 10.

The side surface-fixing plate 211 includes a unit-elastic contact portion 212 and a locking lance 213 inserted into a locking groove 221 of the shield plate-fixing plate 220. The unit-elastic contact portion 212 protrudes toward the outside of the side surface-fixing plate 211 so as to elastically come into contact with the inner surface of the unit 1. The locking lance 213 is inclined in a direction from the surface facing the shield plate-fixing plate 220 toward the surface on the opposite side therefrom. The shield plate-fixing plate 220 has a plate shape of a non-conductive material such as synthetic resin, and has one surface that supports the shield plate 210 and the other surface that supports the inner seal 230. The shield plate-fixing plate 220 is formed to a thickness such that the upper and lower surfaces thereof can support the side surface-fixing plates 211.

The shield plate-fixing plate 220 also has fixing part-cable through-holes 223 and 224 that pass therethrough. The elastic contact portion 216 described above is inserted into the fixing part-cable through-hole 223. A seal holding protrusion 222 protrudes from the other surface of the shield plate-fixing plate 220, that is, the surface facing the inner seal 230. In an embodiment of the present invention, two seal holding protrusions 222 protrude from the upper and lower sides. The locking groove 221 is recessed from each of the upper and lower surfaces of the shield plate-fixing plate 220.

Therefore, as illustrated in FIG. 6, when the shield plate-fixing plate 220 is coupled to the shield plate 210, the locking lance 213 is inserted into the locking groove 221, and in this state, it is possible to prevent the shield plate 210 from being separated from the shield plate-fixing plate 220.

The inner seal 230 includes an elastic material and has a plate shape. A seal fastening groove 231 passes through the inner seal 230 so that the seal holding protrusion 222 can be inserted therein, and inner seal-cable through-holes 232 and 233 pass through the inner seal 230.

The inner seal 230 is fixed to the shield plate-fixing plate 220 as the seal holding protrusion 222 is inserted into the seal fastening groove 231 as illustrated in FIG. 8.

The movable part-cable through-holes of the sub assembly 200 includes the shield plate-cable through-holes 217 and 218, the fixing part-cable through-holes 223 and 224, and the inner seal-cable through-holes 232 and 233.

Hereinafter, a process of assembling a shield connector according to an embodiment of the present invention.

FIGS. 9 to 13 are perspective views sequentially illustrating a process of assembling a shield connector according to an embodiment of the present invention.

Figure 9:
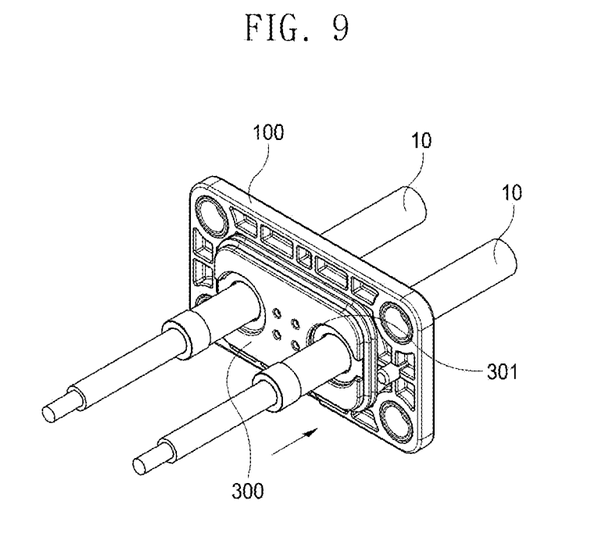
FIGS. 9 to 13 are perspective views sequentially illustrating a process of assembling a shield connector according to an embodiment of the present invention.

First, as illustrates in FIG. 9, a high-voltage cable 10 is installed through a fixing part-cable through-hole 111 and an outer seal-cable through-hole 301.

Figure 10:
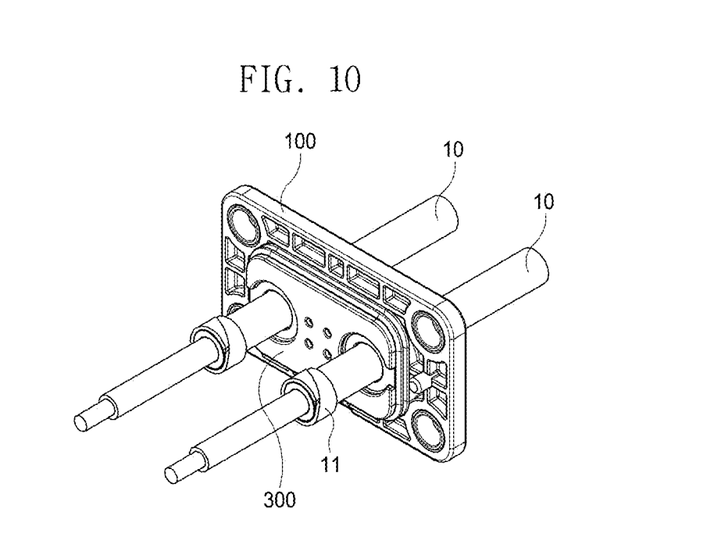

Next, as illustrated in FIG. 10, a shield wire 15 is clamped by using a shield ring 11.

Figure 11:
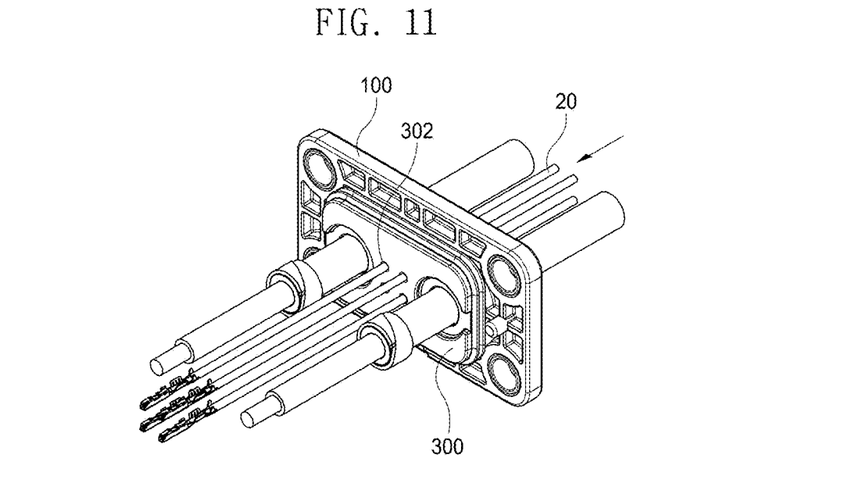

Then, as illustrated in FIG. 11, a low-voltage cable 20 is installed through the fixing part-cable through-hole 112 and the outer seal-cable through-hole 302.

Figure 12:
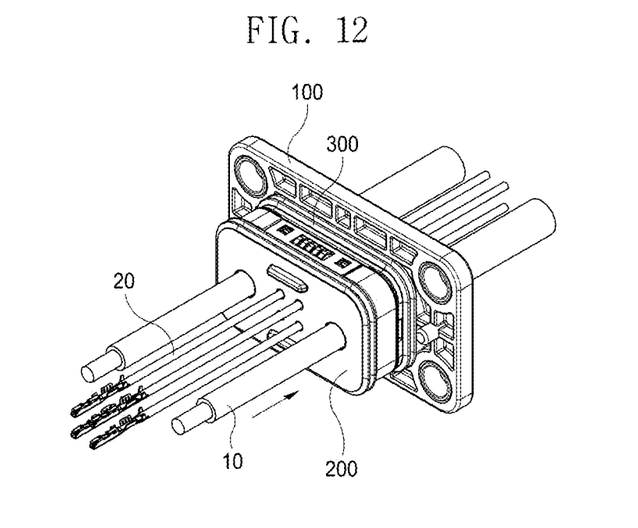

Subsequently, as illustrated in FIG. 12, the high-voltage cable 10 and the low-voltage cable 20 are inserted into the sub assembly 200 via movable part-cable through-holes.

Figure 13:
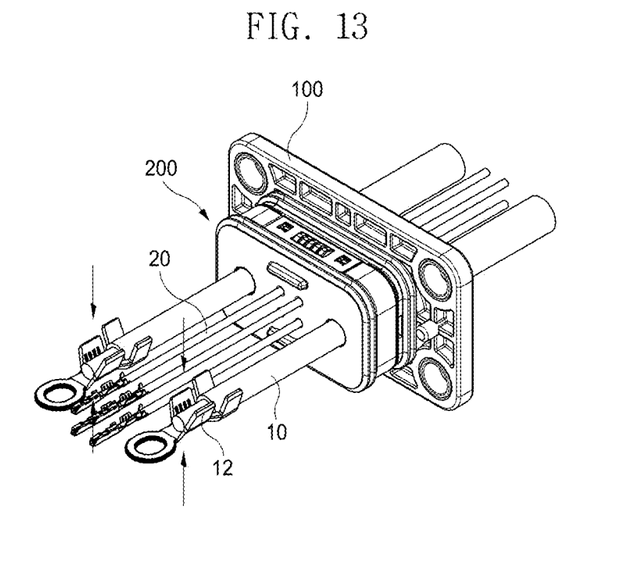
Figure 14:
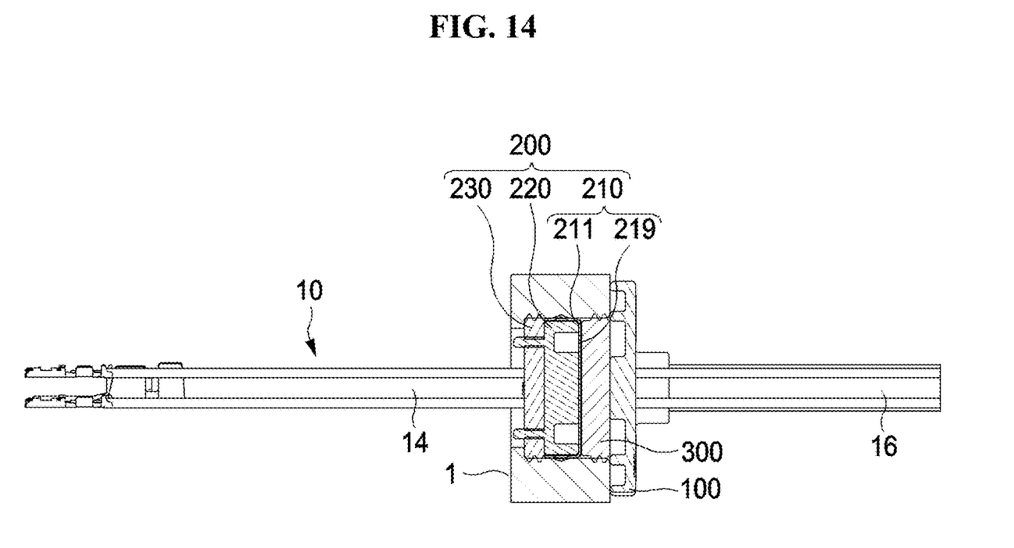
FIGS. 14 and 15 are cross-sectional views showing a state in which a shield connector is assembled according to an embodiment of the present invention.
Figure 15:
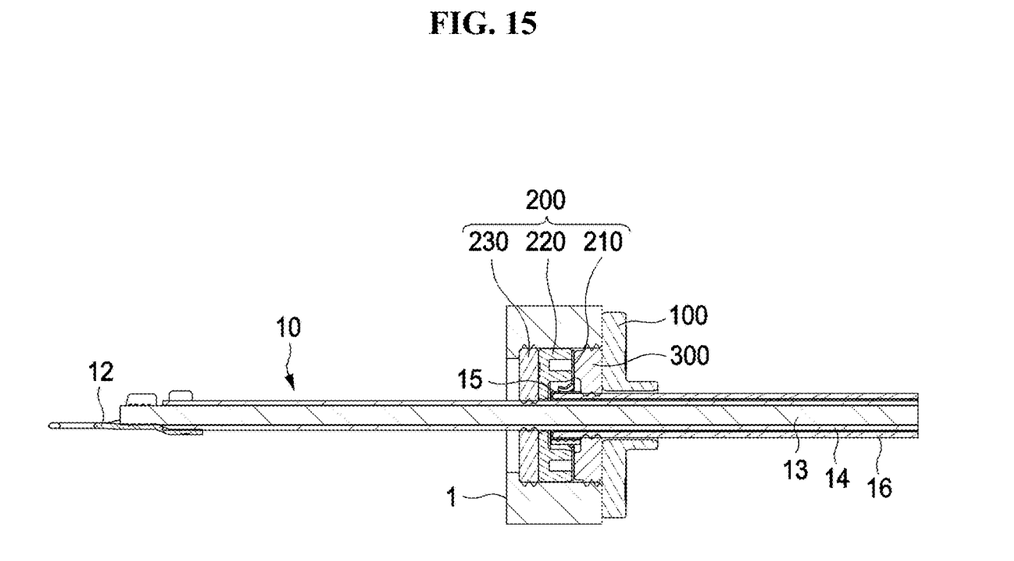

Next, as illustrated in FIG. 13, a high-voltage terminal 12 is coupled to the high-voltage shield cable 10.

In a state in which the assembly is completed as described above, the shield connector is mounted to an installation hole of a unit 1 and then fastened thereto by a bolt. Here, the terminals 12 and 21 are fastened to a terminal coupling portion (not shown) inside the unit 1.

As described above, the shield connector according to the embodiment of the present invention makes it possible to directly install the cable in the unit without the need for the separate male and female connectors. As a result, it is possible to reduce the number of components and costs and significantly decrease the required weight.

Also, the effective shielding and sealing are possible.

In addition, since the length of the wire can be flexibly adjusted when fastened to the unit, the fastening operation with respect to the unit becomes much easier.

As described above, various effects including the following matters may be expected according to the technical solution of the present invention. However, the present invention does not need to exhibit all the following effects.

The shield connector according to the embodiment of the present invention makes it possible to directly install the cable in the unit without the need for the separate male and female connectors. As a result, it is possible to reduce the number of components and costs and significantly decrease the required weight.

Also, the effective shielding and sealing are possible.

In addition, since the length of the wire can be flexibly adjusted when fastened to the unit, the fastening operation with respect to the unit becomes much easier.

Although the embodiments of the present invention have been illustratively described, the scope of the invention is not limited to these specific embodiments, but can be appropriately modified within the scope described in the claims.

What is claimed is:

1. A shield connector for supporting cables (10, 20) such that terminals (12, 21) of the cables (10, 20) are directly connected to a terminal coupling portion inside a unit, the shield connector comprising:
   a fixing plate (100) which comprises fixing part-cable through-holes (111, 112), through which the cables (10, 20) pass, and a holding fastening portion (113); and
   a sub assembly (200) which comprises movable part-cable through-holes, through which the cables (10, 20) pass, and has one surface supported by the fixing plate (100),
   wherein the sub assembly (200) comprises:
   a shield plate (210) comprising a body plate (219), a high-voltage cable through-hole (217) formed to penetrate the body plate (219), and an elastic contact portion (216) formed on the inner circumferential surface of the high-voltage cable through-hole (217);
   a shield plate-fixing plate (220) having one surface that fixes the shield plate (210); and
   an inner seal (230) which is fixed to other surface of the shield plate-fixing plate (220) and seals a contact surface with the unit.

2. The shield connector of claim 1, further comprising an outer seal (300) which is positioned between the sub assembly (200) and the fixing plate (100) and seals a contact surface with the unit.

3. The shield connector of claim 1, wherein the shield plate (210) comprises:
   a side surface-fixing plate (211) which surrounds a side surface of the shield plate-fixing plate (220) and is fixed to the shield plate-fixing plate (220); and
   a unit-elastic contact portion (212) having a spring shape that protrudes from the side surface-fixing plate (211).

4. The shield connector of claim 3, wherein a locking groove (221) is recessed from the side surface of the shield plate-fixing plate (220), and
   the side surface-fixing plate (211) further comprises a locking lance (213) inserted into the locking groove (221).

5. The shield connector of claim 1, wherein the sub assembly (200) further comprises:
   a seal holding protrusion (222) protruding from the other surface of the shield plate-fixing plate (220); and
   a seal fastening groove (231) which passes through the inner seal (230) so that the seal holding protrusion (222) is inserted therein.

* * * * *